United States Patent
Carter et al.

(10) Patent No.: US 7,433,165 B2
(45) Date of Patent: Oct. 7, 2008

(54) AUTO-RESETTING SPAN-POWER PROTECTION

(75) Inventors: Michael Carter, Clayton, NC (US); William J. Fox, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 347 days.

(21) Appl. No.: 11/378,174

(22) Filed: Mar. 17, 2006

(65) Prior Publication Data

US 2007/0217101 A1    Sep. 20, 2007

(51) Int. Cl.
*H02H 9/00* (2006.01)

(52) U.S. Cl. ............................ 361/54; 361/57; 361/119; 379/412

(58) Field of Classification Search ............. 361/54–57, 361/111, 119; 379/412
See application file for complete search history.

(56) References Cited

U.S. PATENT DOCUMENTS

| | | | |
|---|---|---|---|
| 3,717,858 A | 2/1973 | Hadden | |
| 3,870,822 A | 3/1975 | Matthews | |
| 3,968,333 A | 7/1976 | Simokat et al. | |
| 4,639,714 A | 1/1987 | Crowe | |
| 5,146,384 A * | 9/1992 | Markovic et al. | ............. 361/55 |
| 5,148,144 A | 9/1992 | Sutterlin et al. | |
| 5,283,905 A | 2/1994 | Saadeh et al. | |
| 5,430,633 A | 7/1995 | Smith | |
| 5,602,724 A | 2/1997 | Balakrishnan | |
| 5,627,833 A | 5/1997 | Bliven | |
| 5,666,538 A | 9/1997 | DeNicola | |
| 5,694,398 A | 12/1997 | Doll et al. | |
| 5,774,689 A | 6/1998 | Curtis et al. | |
| 5,777,769 A | 7/1998 | Coutinho | |
| 5,793,265 A | 8/1998 | Spielman | |
| 5,796,595 A | 8/1998 | Cross | |
| 5,818,125 A | 10/1998 | Manchester | |
| 5,818,127 A | 10/1998 | Abraham | |
| 5,953,237 A | 9/1999 | Indermaur et al. | |
| 5,977,650 A | 11/1999 | Rickard et al. | |
| 5,990,575 A | 11/1999 | Flaugher | |
| 6,037,678 A | 3/2000 | Rickard | |
| 6,176,710 B1 | 1/2001 | Ewing et al. | |
| 6,178,080 B1 * | 1/2001 | Wilken et al. | ............... 361/119 |
| 6,199,180 B1 | 3/2001 | Ote et al. | |
| 6,208,670 B1 | 3/2001 | Milliron et al. | |
| 6,208,714 B1 | 3/2001 | Brablec | |

(Continued)

FOREIGN PATENT DOCUMENTS

DE    3310242    *    9/1987

(Continued)

*Primary Examiner*—Michael J Sherry
*Assistant Examiner*—Terrence R Willoughby
(74) *Attorney, Agent, or Firm*—Fogg & Powers LLC

(57) ABSTRACT

Systems and methods for auto-resetting span power protection are provided. In one embodiment, a method for deactivating a protective device is provided. The method comprises determining when an overload condition occurs on a communication medium; when the overload condition occurs, deactivating at least one protective device by applying, for a first predetermined period of time, a short-circuit to an output of a power supply that provides a holding current to the at least one protective device; and after the first predetermined period of time has elapsed, removing the short-circuit on the output of the power supply.

23 Claims, 8 Drawing Sheets

U.S. PATENT DOCUMENTS

| | | |
|---|---|---|
| 6,329,906 B1 | 12/2001 | Fisher et al. |
| 6,366,657 B1 | 4/2002 | Yagel et al. |
| 6,504,267 B1 | 1/2003 | Giannopoulos |
| 6,546,089 B1 | 4/2003 | Chea, Jr. et al. |
| 6,563,926 B1 * | 5/2003 | Pistilli ........................ 379/412 |
| 6,580,254 B2 | 6/2003 | Schofield |
| 6,587,953 B1 | 7/2003 | Torikai |
| 6,606,383 B1 | 8/2003 | Robinson et al. |
| 6,643,566 B1 | 11/2003 | Lehr et al. |
| 6,754,089 B2 | 6/2004 | Balakrishnan et al. |
| 6,809,678 B2 | 10/2004 | Vera et al. |
| 6,825,726 B2 | 11/2004 | French et al. |
| 2001/0033502 A1 | 10/2001 | Blair et al. |
| 2002/0002593 A1 | 1/2002 | Ewing et al. |
| 2002/0039269 A1 | 4/2002 | Kumagai et al. |
| 2002/0085325 A1 | 7/2002 | Suzuki et al. |
| 2002/0097546 A1 | 7/2002 | Weinberger |
| 2003/0112573 A1 | 6/2003 | Perez |
| 2003/0135773 A1 | 7/2003 | Zhang et al. |
| 2003/0185385 A1 | 10/2003 | Boudreaux, Jr. et al. |
| 2003/0221133 A1 | 11/2003 | Nguyen et al. |
| 2004/0104707 A1 | 6/2004 | May et al. |
| 2004/0110483 A1 | 6/2004 | Mollenkopf |
| 2004/0196134 A1 | 10/2004 | Milanczak |
| 2004/0239512 A1 * | 12/2004 | Lomax et al. ............... 340/638 |
| 2005/0001607 A1 | 1/2005 | Berland et al. |
| 2005/0064914 A1 | 3/2005 | Gough |

FOREIGN PATENT DOCUMENTS

| | | |
|---|---|---|
| WO | 9320645 | 10/1993 |
| WO | 0036809 | 6/2000 |
| WO | 02067279 | 8/2002 |

\* cited by examiner

AUTO-RESETTING SPAN-POWER PROTECTION

BACKGROUND

In many telecommunications applications, repeaters and other electronic devices are housed in remote units scattered throughout a geographical region in the vicinity of a central office. In one example, a remote unit communicates with the central office and also receives power from the central office through the same cable or other communication medium. This cable is also referred to as a "span cable." An example of a span cable includes, a span cable comprising a set of twisted-pair conductors over which telecommunications data is transferred between the central office and the remote units, and over which DC power is supplied by the central office to the remote unit. The remote unit typically utilizes the power received from the central office over the span cable to power one or more electronic devices within the remote unit. The power delivered via a span cable is often susceptible to disturbances (such as faults, voltage spikes and surges) caused by environmental factors such as lighting and nearby electrostatic discharges. Left unmitigated, such power disturbances can interrupt telecommunications operations and permanently damage equipment.

A variety of lightning arrestors, surge protectors, and the like are available to mitigate voltage and other power disturbances. When installed in a span-powered remote unit, at least one such protective device protects the electronic devices within the remote unit by shunting the surge away from the electronic devices. One approach is to install one or more "crowbarring" solid-state protective devices between the conductors of a span cable or between conductors of the span cable and ground. During normal operation with nominal voltage across the protective device, the protective device behaves as a high impedance (that is, an "open") element through which current does not flow. However, when the voltage across the protective device exceeds a certain threshold (for example, due to a disturbance related to the span cable), the device becomes a short circuit, protecting the electronic devices by shunting current away from the electronic devices. Often, such a protective device is designed to remain shorted in this way as long as a holding current continues to flow through the protective device. Examples of such crowbarring solid-state surge protection devices include, but are not limited to SIDACTOR devices manufactured by Littlefuse, Inc.

However, current provided from a power supply at the central office typically will continue to feed current through a shorted protective device, preventing the protective device from resetting itself, even after the power disturbance has passed. In such a situation, to reset the protective device, the power supply at the central office is typically powered down and then turned back on (that is, the power supply is "rebooted"). While the protective device is shorted, the limited power received from the span cable at the remote unit is not sufficient to power the remote unit. Also, while the power supply is rebooting, power is not supplied on the span cable for powering the remote unit. At the central office, the entire process of detecting an "on" (that is, shorted) protective device, rebooting the power supply, and returning the system to a data carrying mode, can take several seconds. Remote units typically only maintain sufficient capacitive energy storage to ride through a loss of span power in the range of 15 to 20 milliseconds, and the installation of additional capacitive storage is prohibitively expensive. When such stored energy is exhausted, any communication link between the central office and the remote unit will typically go down. As a result, even span-power disturbances of only a few milliseconds in duration can result in the loss of span power between a central office and a remote unit for several seconds, and the loss of any communication link between them as well.

SUMMARY

In one embodiment, a method for deactivating a protective device is provided. The method comprises determining when an overload condition occurs on a communication medium; when the overload condition occurs, deactivating at least one protective device by applying, for a first predetermined period of time, a short-circuit to an output of a power supply that provides a holding current to the at least one protective device; and after the first predetermined period of time has elapsed, removing the short-circuit on the output of the power supply.

In another embodiment, a power interface for a network element having a power supply that produces an overload signal when an overload condition exists is provided. The power interface comprises means for generating a switching signal responsive to the overload signal; and means for switching together a first output leg and a second output leg of the power supply, wherein the first output leg and the second output leg provide a holding current for one or more protective devices, the means for switching together responsive to the means for generating a switching signal; wherein the means for switching together switches together the first output leg and the second output leg of the power supply for a first predetermined period of time in response to the switching signal.

In yet another embodiment, a power interface for a network element is provided. The power interface comprises a shorting switch coupled across a first output and a second output of a power supply and adapted to apply a short-circuit across the first output and the second output when closed; a switch controller coupled to the shorting switch and adapted to receive an overload signal from the power supply; the switch controller further adapted to close the shorting switch coupled across the first output and the second output when the overload signal is asserted; wherein when the overload signal is asserted, the switch controller is adapted to deactivate at least one protective device by closing the shorting switch for a first predetermined period of time.

DRAWINGS

In accordance with common practice, the various described features are not drawn to scale but are drawn to emphasize features relevant to the subject matter disclosed herein. Reference characters denote like elements throughout figures and text.

DETAILED DESCRIPTION

Figure 1:
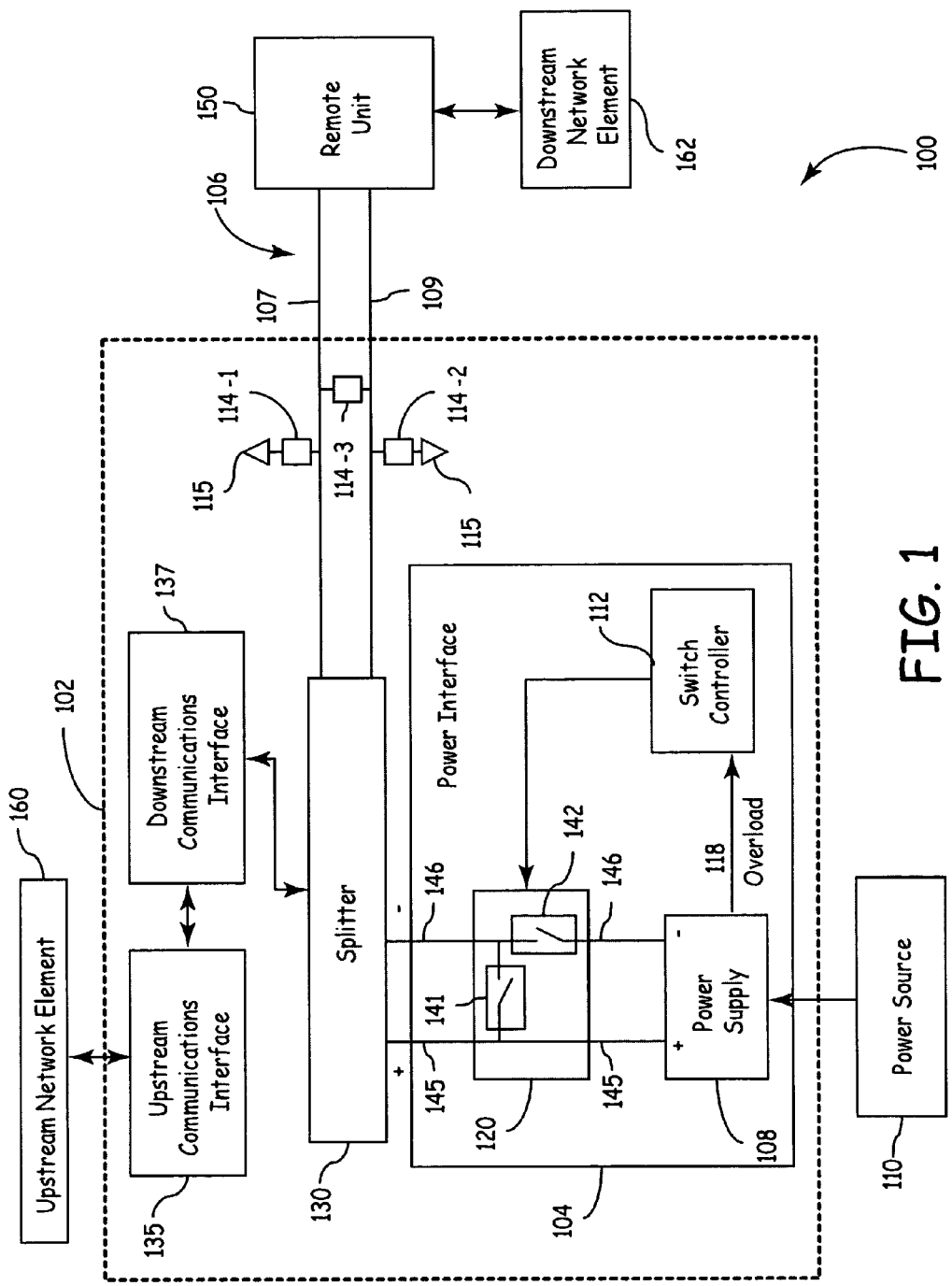
FIG. 1 is a block diagram of one embodiment of a network.

FIG. 1 is a block diagram of one embodiment of a network 100. Network 100 includes at least one network element 102 (referred to here as a "source network element") that provides power to at least one other network element 150 (referred to here as a "sink network element") over a communication medium 106 (referred to here as a "power communication medium"). Providing power over such a communication medium is also referred to here as "span powering" and the power communication medium 106 is also referred to here as the "span 106."

In the particular embodiment shown in FIG. 1, the source network element 102 comprises a central office terminal located in a central office of a service provider and is also referred to here as "central office terminal 102" (though it is to be understood that, in other embodiments, the source network element is implemented in other ways and/or in other devices and is not limited to the central office). Also, in the particular embodiment shown in FIG. 1, sink network element 150 comprises one or more remote units (only one of which is shown in FIG. 1) located in the outside plant of the network 100 and is also referred to here as "remote unit 150" (though it is to be understood that, in other embodiments, the sink network element is implemented in other ways, in other devices, and in other numbers). Exemplary remote units include, without limitation, remote terminals, doublers, or repeaters.

Both the central office terminal 102 and remote unit 150 are typically communicatively coupled to other network elements. In the particular embodiment shown in FIG. 1, the central office terminal 102 is communicatively coupled to one or more upstream network elements 160 (which in turn communicatively couples the central office terminal 102 to one or more other networks such as the Internet and/or a public switched telephone network (PSTN)) and the remote unit 150 is communicatively coupled to one or more downstream network elements 162 such as various items of customer located equipment (for example, a modem, wireless access point, or telephone set). Although only one upstream network element 160 and one downstream network element 162 is shown in FIG. 1, others numbers of upstream network elements 160 or downstream network elements 162 are used in other embodiments.

The central office terminal 102 and each remote unit 150 communicate with one another using some type of communication link. In the particular embodiment shown in FIG. 1, the central office terminal 102 and the remote unit 150 communicate over a DSL communication link provisioned therebetween. Examples of DSL communication links includes a high-bit rate DSL (HDSL) link, high-bit rate digital subscriber line 2 (HDSL 2) link, high-bit rate digital subscriber line 4 (HDSL 4) link, asymmetric digital subscriber line (ADSL) link, or symmetric DSL link conforming to the International Telecommunication Union (ITU) standard G.991.2 (also referred to as a "G.SHDSL" link) that are provisioned over one or more twisted-pair telephone lines. In other implementations and embodiments, other types and numbers of communication links are used and/or are provisioned over other types of communication media.

In the particular embodiment shown in FIG. 1, the span 106 is implemented using a single twisted-pair telephone line comprising a tip line 107 and a ring line 109 and the communication link is provisioned on the same communication medium used to supply power from central office terminal 102 to the remote unit 150 (that is, on the twisted-pair telephone line used to implement the span 106). In other embodiments, a separate communication medium (that is, separate from the communication medium used to provide power) is used to provision a communication link between a source network element and a sink network element.

In the embodiment shown in FIG. 1, the central office terminal 102 comprises an upstream communication interface 135 for communicatively coupling the central office terminal 102 to the upstream network element 160 and a downstream communication interface 137 for communicatively coupling the central office terminal 102 to the remote unit 150 over the span 106. The upstream communication interface 135 comprises appropriate functionality for receiving data traffic from the upstream network element 160 and converting at least a portion of the received data traffic into a format suitable for transmission to the downstream communication interface 137. The downstream communication interface 137 comprises appropriate functionality for formatting such traffic received from the upstream communication interface 135 into a format suitable for transmission on the span 106 (and the communication link provisioned thereon) and for transmitting the formatted traffic on the span 106 (and the communication link provisioned thereon). The downstream communication interface 137 comprises appropriate functionality for receiving data traffic from the downstream network element 162 and converting at least a portion of the received data traffic into a format suitable for transmission to the upstream communication interface 135. The upstream communication interface 135 comprises appropriate functionality for formatting such traffic received from the downstream communication interface 137 into a format suitable for transmission to the upstream network element 160 and for transmitting the formatted traffic to the upstream network element 160. In an alternative embodiment where central office terminal 102 comprises one upstream communication interface 135 for communicating with one upstream network element 160 and multiple downstream communication interfaces 137 for communicating with multiple remote units 150, the upstream communication interface 135 demultiplexes data traffic received from the upstream network element 160 into separates data streams for transmission to respective remote units 150 via respective downstream communication interfaces 137. Also, in such an alternative embodiment, the upstream communication interface multiplexes multiple stream of data traffic received from the multiple downstream communication interfaces 137 into a single stream of data traffic for transmission to the upstream network element 160. In one implementation of such an embodiment, the single upstream communication interface 135 and each of the multiple downstream communication interfaces 137 are implemented as separate cards or other modules that are inserted into a common enclosure and that communicate with one another over a common backplane. Other embodiments are implemented in other ways.

The central office terminal 102 comprises a power interface 104 for coupling the central office terminal 102 to a power source 110 in order to obtain power that is used to power the central office terminal 102 and to provide power to remote unit 150 over the span 106. In one implementation of the embodiment shown in FIG. 1, power source 110 comprises a direct current (DC) and/or an alternating current (AC) power source such as a battery and/or a connection to the main power grid. In other implementations and embodiments, other power sources are used. In the particular embodiment shown in FIG. 1, the power interface 104 includes a power supply 108 that is coupled to the power source 110. In general, power supply 108 receives power from power source 110 and conditions and supplies power on span 106 in order to power one or more remote units 150 coupled to span 106. In one implementation of such an embodiment, power supply 108 is implemented as a fly-back power supply. In the embodiment shown in FIG. 1, central office terminal 102 includes a splitter 130 that combines an output signal of the downstream communication interface 137 (which includes data to be transmitted to the remote unit 150 on the span 106) and an output signal of the power interface 104 (which includes power to be supplied to the remote unit 150 on the span 106) and applies the combined data and power signal to span 106. Also, the splitter 130 forwards the signal received from the span 106 (which includes data transmitted from the remote unit 150 on the span 106) to the downstream communication interface 137.

The span 106 is protected from destructive voltage surges by one or more protective devices. In the embodiment shown in FIG. 1, a first protective device 114-1 is coupled between the tip line 107 and ground 115, a second protective device 114-2 is coupled between the ring line 109 and ground 115, and a third protective device 114-3 is coupled between the ring line 109 and the tip line 107. In other embodiments, the same protection schemes appear at the span 106 interface of the remote unit 150 and any double or repeater units that may be present in the particular implementation of the system.

Figure 8A:
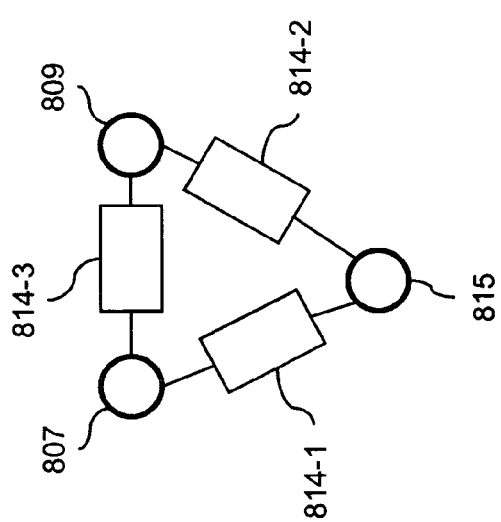
FIGS. 8A, 8B and 8C illustrate alternative configurations for protective devices.
Figure 8C:
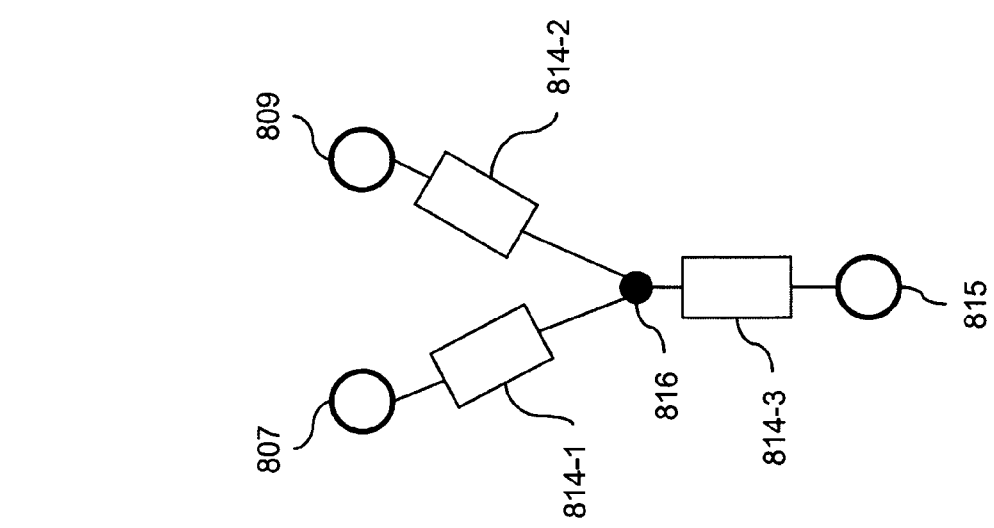
Figure 8B:
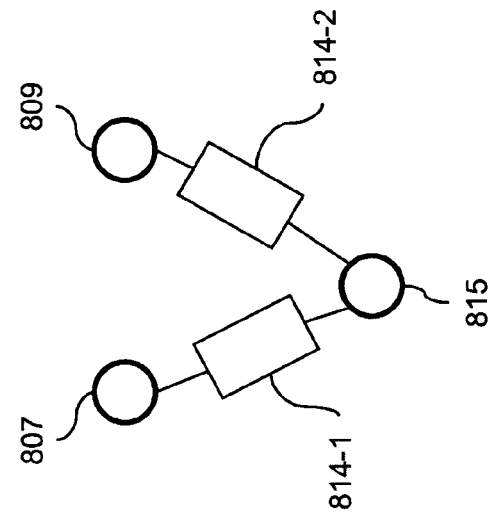

The embodiment shown in FIG. 1 comprises a delta connection for the protective devices 114-1, 114-2 and 114-3. FIGS. 8A, 8B and 8C show alternate embodiments where protective devices are arranged on a span line in delta, open-delta and wye configurations, respectively. In the delta configuration illustrated in FIG. 8A, a first protective device 814-1 is coupled between a tip line 807 and a ground 815, a second protective device 814-2 is coupled between a ring line 809 and the ground 815, and a third protective device 814-3 is coupled between the ring line 809 and the tip line 807. With the open-delta configuration illustrated in FIG. 8B, only two protective devices are used to protect the span. A first protective device 814-1 is coupled between tip line 807 and a ground 815, and a second protective device 814-2 is coupled between ring line 809 and the ground 815. In the wye configuration illustrated in FIG. 8C, a first protective device 814-1 is coupled to tip line 807 and a second protective device 814-2 is coupled to ring line 809. The first protective device 814-1 and second protective device 814-2 are coupled together at common point 816. The third protective device 814-3 is coupled between common point 816 and ground 815. In other embodiments, where a span is implemented using communication media that comprise more than two conductors, protective devices can be applied between each of the conductors and ground and/or between the various conductors in other combinations. It would be appreciated by one or ordinary skill in the art upon reading this specification, that any of the protective devices 814-1, 814-2, 814-3 may internally comprise either a single crowbarring solid-state surge protection devices, or two or more crowbarring solid-state surge protection devices in order to achieve a desired breakdown voltage level.

In one implementation of such an embodiment, the protective devices 114-1, 114-2, and 114-3 comprise "crowbarring" solid-state surge protectors such as, but not limited to, SIDACTOR devices manufactured by Littlefuse, Inc., that operate like a switch. These crowbarring solid-state surge protectors, activate (that is, they "close" to allow current to flow through them) based on a voltage across the devices, and deactivate (that is, they "open" to stop current flowing through them) based on the magnitude of current flow through the device. In such an implementation, when the voltage across one or more of the protective devices 114-1 and 114-2 exceeds a turn on voltage, that protective device activates and shorts the associated line 107 or 109 of span 106 to ground 115 until the current conducted by that protective device drops below a holding current for that protective device. In one implementation of the embodiment shown in FIG. 1, ground 115 comprises chassis ground of the power supply 108 or the power interface 104. When the voltage across protective device 114-3 exceeds a turn on voltage, that protective device activates and shorts line 107 to line 109 of span 106 until the current conducted by that protective device drops below a holding current for that protective device.

Once one or more of the protective devices activate, the protective devices will remain activated as long as power supply 108 continues to provide a sufficient current that exceeds the holding currents of the protective devices. If protective device 114-1 or protective device 114-2 shorts line 107 or line 109, respectively, to ground or protective device 114-3 shorts line 107 and line 109 to one another, remote unit 150 will be deprived of power to operate as long as one of the protective devices 114-1, 114-2 and 114-3 remains activated.

In the embodiment shown in FIG. 1, the protective devices 114-1, 114-2 and 114-3 can be deactivated without rebooting the power supply 108 by shorting together the two output legs 145 and 146 of power supply 108 that supply power to span 106. By shorting the output legs 145 and 146 of power supply 108, the protective devices 114-1, 114-2 and 114-3 are deprived of the holding current the protective devices 114-1, 114-2 and 114-3 require to remain activated.

In the particular embodiment shown in FIG. 1, in order to short output legs 145 and 146 of power supply 108, the power interface 104 further comprises a switch 120 and a switch controller 112. Switch controller 112 controls the operation of switch 120 based on an overload signal 118 output by the power supply 108. In the particular embodiment shown in FIG. 1, switch 120 comprises a first switching circuit 141 that, in response to the overload signal 118 being asserted by the switch controller 112, shorts the first leg 145 of the output of power supply 108 to the second leg 146 of the output of the power supply 108. Although switch controller 112 is shown as being a part of power interface 104 in FIG. 1, in other embodiments at least a portion of the switch controller 112 is implemented using a general controller or control circuitry for the central office terminal 102. In other embodiments, at least some of the functions performed by one or both of switch controller 112 and switch 120 are incorporated directly into control circuitry of power supply 108. In alternate embodiments, switch controller 112 is implemented in hardware (for example, using analog and/or digital circuits) and/or in software (for example, by programming a programmable processor with appropriate instructions to carry out the various control functions described here).

In operation, power supply 108 asserts the overload signal 118 whenever power supply 108 is supplying power with an anomalously high output current. This condition is referred to herein as an "overload condition." For example, an overload condition can occur when the remote unit 150 coupled to span 106 draws an excessive amount of current from power supply 108. An overload condition can also occur due to a line-to-line or line-to-ground fault on span 106. Because when one or more of the protective devices 114-1, 114-2, and 114-3 activate, they effectively establish line-to-line or line-to-ground faults on span 106, power supply 108 recognizes the activation of such protective devices 114-1, 114-2, or 114-3 as an overload condition. When an overload condition exists, power supply 108 communicates that fact to switch controller 112 by asserting the overload signal 118. Switch controller 112 reacts to the assertion of the overload signal 118 by activating switch 120 to short the output legs 145 and 146 of power supply 108. When an overload condition results from the operation of one or more of protective devices 114-1, 114-2 and 114-3, activating switch 120 shorts the output of power supply 108, thus denying protective devices 114-1, 114-2, 114-3 with the holding current the protective devices need to remain activated. Thus, protective devices are deactivated to restore power to one or more remote units 150. One example of how such an approach can be used to respond to an overload condition is described below in connection with FIG. 2.

The remote unit 150 typically only maintains sufficient capacitive energy storage to withstand a loss of span power in the range of 15 to 20 milliseconds. In one implementation of the embodiment shown in FIG. 1, switch controller 112 deactivates protective devices 113 by activating switch 120 within an elapsed time less than the capacitive energy discharge time of the remote unit 150 so that remote unit 150 continues to operate throughout the event. For example, in such an implementation, in less than 7 milliseconds, power supply 108 detects an overload condition and asserts the overload signal 118. Switch controller 112, in response to the asserted overload signal 118, activates switch 120 in order to cause the output legs 145 and 146 of the power supply 108 to be shorted together thought first switching circuit 141 (which deactivates the activated protective devices), and switch controller 112 deactivates switch 120 to restore power to one or more remote units 150 by causing the output legs 145 and 146 of the power supply 108 to no longer be shorted together.

In the particular embodiment shown in FIG. 1, in addition to providing power to the remote unit 150 over the span 106, the power interface 104 (and power supply 108 therein) also provides power to the various components of the central office terminal 102. In such an embodiment, the switch 120 is designed so that shorting the output legs 145 and 146 of power supply 108 does not inhibit the power supply 108 from providing power to the various components of the central office terminal 102. Switch 120, in such an embodiment, further comprises a second switching circuit 142. In response to the overload signal 118 being asserted by the switch controller 112, second switching circuit 142 opens to decouple from power supply 108 the short created by first switching circuit 141 in response to the assertion of the overload signal 118. In operation, when the overload signal 118 is asserted by switch controller 112, the first switching circuit 141 shorts output legs 145 and 146 of power supply 108 to deprive protective devices of holding current while the second switching circuit 142 opens to prevent short circuit current from disabling power supply 108. This state of the switch 120 is also referred to here as "no-span-power" state. The state of the switch 120 where the first switching circuit 141 is opened so that the output legs 145 and 146 of power supply 108 are not shorted together and the second switching circuit 142 is closed is also referred to here as the "normal" state of the switch 120. Thus power supply 108 is able to continue to power the various components of the central office terminal 102 while not providing power to the remote unit 150. In many telecommunications applications, it would be advantageous for the second switching circuit 142 to open the most negative leg of power supply 108 (with respect to ground) to maintain any non-opened legs of power supply 108 negative with respect to ground.

Although FIG. 1 illustrates an embodiment where the central officer terminal is protected by surge protection devices, one average skill in the art would appreciate that other network elements coupled to a span cable can also be protected locally by one or more surge protection devices. Such network elements include, but are not limited to remote units, doublers and repeater units. These protective devices can also be deactivated without rebooting the span power supply by shorting together the output legs that supply power the span cable. These alternate embodiments are thus contemplated as within the scope of embodiments of the present invention.

Because overload conditions can exist on span 106 for reasons other than the activation of protective devices 114-1, 114-2 and 114-3, in one implementation of the embodiment shown in FIG. 1, switch controller 112 causes switch 120 once within a pre-defined time period to allow other protective features of power interface 104 (not shown) to detect and mitigate other potential fault conditions based on a continuing overload condition. One example of such an approach is illustrated in FIG. 2.

Figure 2:
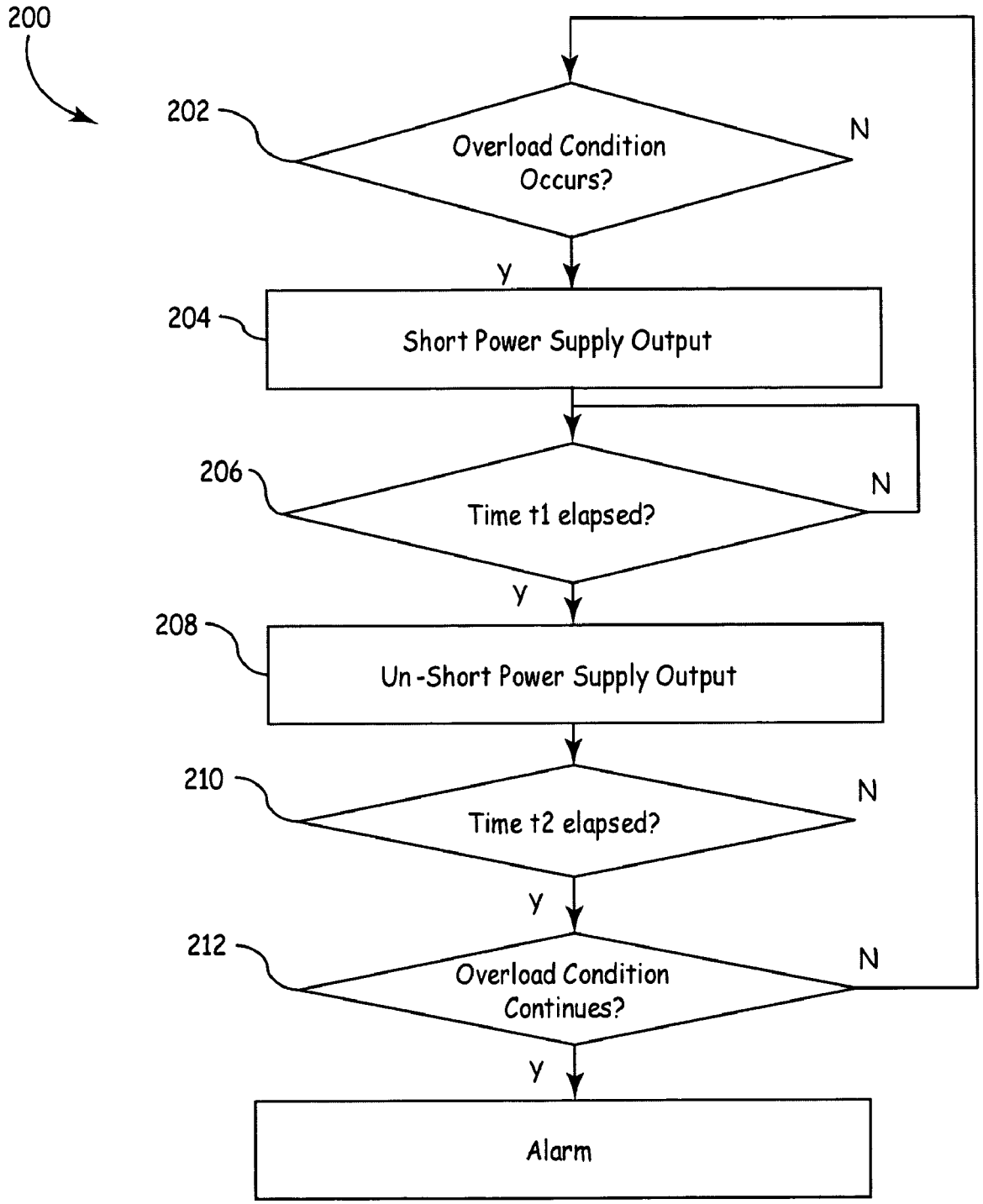
FIG. 2 is a flow chart of one embodiment of a method

FIG. 2 is flow diagram of one embodiment of a method 200 of responding to an overload condition in a network having span-powered network elements. The embodiment shown in FIG. 2 is described here as being implemented in the network 100 of FIG. 1, though other embodiments are implemented using other types of source network elements and/or in other applications (for example, in the applications described below in connection with FIGS. 5-7). In such an embodiment, the processing of method 200 is performed by the switch controller 112 of the power interface 104.

Method 200 comprises determining when an overload condition first occurs (checked in block 202). The switch controller 112 makes this determination based on the overload signal 118 that is asserted by the power supply 108 when an overload condition occurs. As noted above, an overload condition may exist for many reasons. An overload condition may exist because of a transient power surge on the span cable 106 due to, for example, lightning. When such a power surge causes the voltage across a protective device on the span cable 106 to exceed a turn on voltage for that protective device, the protective device activates. Where the protective device couples a line 107 or line 109 of the span cable 106 to ground 115 (for example, as illustrated by protective devices 114-1 and 114-2 in FIG. 1), activation of the protective device causes that line of the span cable 106 to be shorted to ground 115. Where the protective device couples a first line 107 of the span cable 106 to a second line 109 of the span cable 106 (for example, as illustrated by protective devices 114-3 in FIG. 1), activation of the protective device shorts the two lines 107 and 109 together. In all cases, the activated protective device will remain activated until the current conducted by the activated protective device drops below the holding current for the activated protective device.

Method 200 further comprises, when an overload condition first occurs, shorting the power supply outputs for a predetermined period of time t1 (block 204). When the switch controller 112 determines that the overload signal 118 has first been asserted by the power supply 108, the switch controller 112 initially responds to overload signal 118 by causing switch 120 to enter the no-span-power state (that is, by closing switching circuit 141 and opening switching circuit 142) for the predetermined period of time t1. Doing this results in no span power being supplied over the span 106, which is intended to give any protective devices coupled to the span 106 that have been activated time to reset as result of being deprived of their holding current. Consequently, the duration of the predetermined period of time t1 is selected so as to be sufficient to permit any protective device that has been activated to be reset as result of being deprived of span-power on the span 106 yet less than the duration of the capacitive energy storage time of the remote unit 150. In one implementation of such an embodiment, the predetermined period of time t1 comprises 7 milliseconds.

Method 200 further comprises determining when the predetermined period of time t1 has elapsed (checked in block 206). For example, the switch controller 112, in one implementation of the embodiment shown in FIG. 2, uses a timer (such as a countdown timer) to determine when the predetermined period of time t1 has elapsed.

Method 200 further comprises, when the predetermined period of time t1 has elapsed, un-shorting the power supply outputs (block 208). The switch controller 112, when the predetermined period of time t1 elapses, causes the switch 120 to enter the normal state (that is, by opening switching circuit 141 and closing switching circuit 142) so that span power is again supplied over the span 106. At this point, if the overload condition was caused by the activation of any protective devices in response to a transient condition (for example, a lightening related power surge) that no longer exists, such activated protective devices should have had time to reset themselves during the predetermined period of time t1 when no span power was being supplied on the span 106. As a result, the overload condition should no longer exist upon resuming supplying span power on the span 106.

Method 200 further comprises determining when a predetermined period of t2 has elapsed since un-shorting the power supply outputs (checked in block 210). The predetermined period of time t2 is selected so as to permit other fault-mitigation functionality to operate upon resuming the supply of span power on the span 106. Examples of such fault-mitigation functionality include, but are not limited to, protective relays, breakers and fuses, and rebooting the power supply. The switch controller 112, in one implementation of the embodiment shown in FIG. 2, uses a timer (such as a countdown timer) to determine when the predetermined period of time t2 (for example, 150 milliseconds) has elapsed.

Method 200 further comprises, when the predetermined period of time t2 has elapsed, determining if the overload condition still exists (block 212). The switch controller 112 makes this determination by examining the state of the overload signal 118 (that is, by checking if the overload signal 118 is asserted). If the overload condition still exists, an alarm or other exception is raised (block 214). For example, an alarm can be signaled to an element or network management application that indicates that a fault requiring some sort of manual intervention has occurred. Otherwise if the overload condition no longer exists, the processing of method 200 is repeated (looping back to block 202). Method 200 allows no further performance of blocks 204, 206 and 208 until the t2 time period has expired.

The particular predetermined periods of time t1 and t2 are application dependent. For example, in one implementation, where the remote unit 150 has sufficient capacitive energy storage to ride through a power loss of 15 milliseconds, time t1 is set as any duration less than 15 milliseconds (for example, 7 milliseconds), which provides time for the protective devices 114-1, 114-2 and 114-3 to deactivate while span power is not being provided. In one implementation, the minimum time t1 is further selected (for example 4 milliseconds) to allow the protective devices 114-1, 114-2 and 114-3 sufficient time to shunt away the energy of the triggering event. In such an implementation, time t2 is set for a sufficiently long period (for example, 150 millisecond) to allow other protective features, such as but not limited to protective relays, breakers, fuses, and rebooting the power supply, to operate as intended.

Although the embodiments of method 200 are described here as sequential steps, this functionality can be implemented in many ways. For example, the functionality can be implemented in analog and/or digital electronic circuitry, or with a programmable processor (for example, a special-purpose processor or a general-purpose process such as a computer), firmware, software, or in combinations of them.

Figure 3:
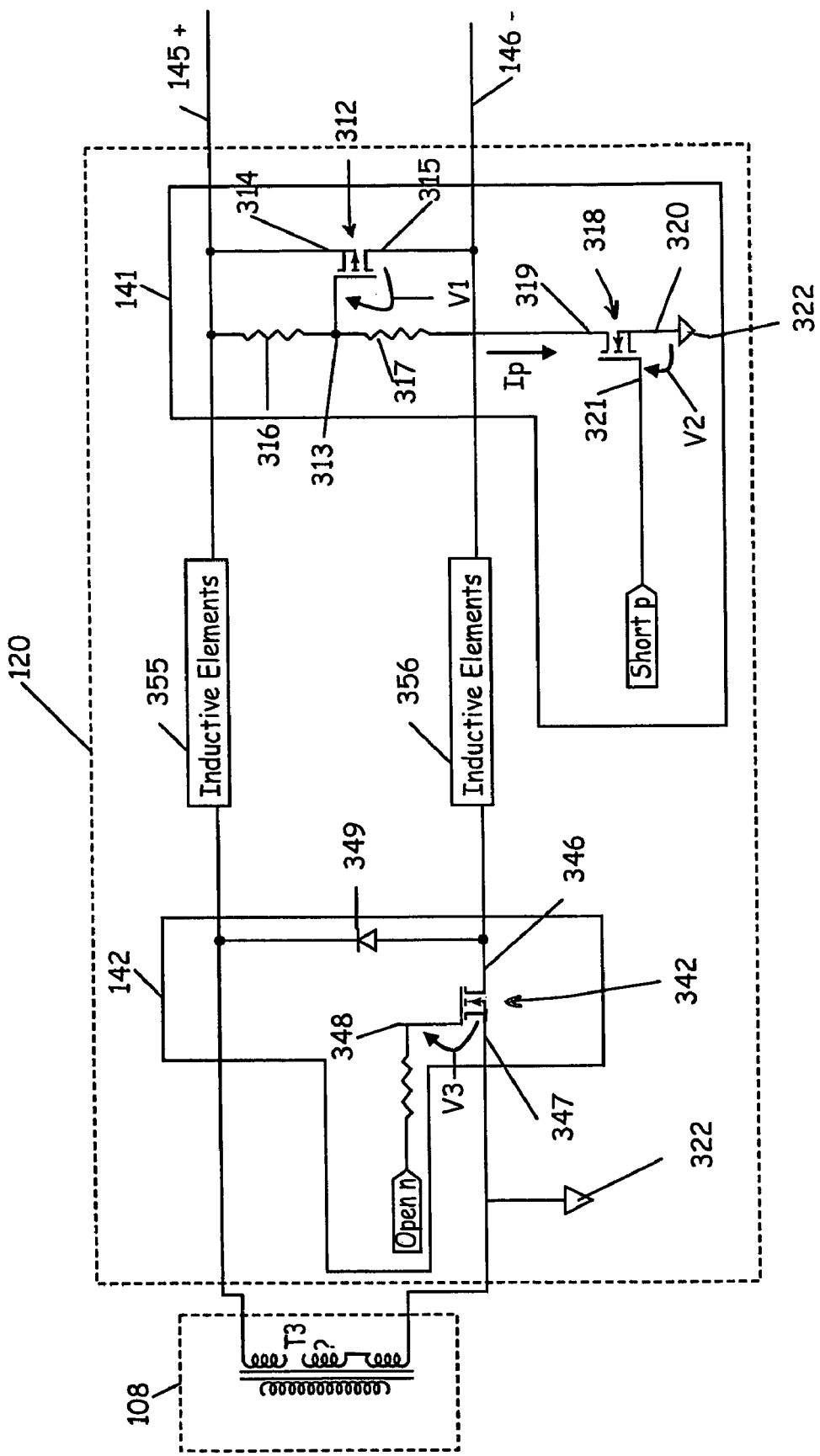
FIG. 3 is a simplified circuit diagram of one embodiment of a switch.

FIG. 3 is a simplified circuit diagram of one embodiment of the switching circuits 141 and 142 of FIG. 1. The particular embodiment of switching circuits 141 and 142 shown in FIG. 3 are described here as being implemented in the network 100 of FIG. 1. In such an embodiment, switching circuit 141 comprises a switching device 312 coupled between the first leg 145 and the second leg 146 of the output of power supply 108. In the particular embodiment shown in FIG. 3, switching device 312 comprises a field-effect transistor (FET) (though, in other embodiments, other types of switching devices are used). More specifically, in the embodiment shown in FIG. 3, switching device 312 is a p-channel enhancement mode metal-oxide-semiconductor FET (MOSFET) having a drain 314 coupled to the first leg 145, a source 315 coupled to the second leg 146, and a gate 313. When a positive voltage (VI) is applied to gate 313 with respect to source 315, switching device 312 allows current to flow from source 315 to drain 314, effectively shorting the first leg 145 to the second leg 146. Because of the short created by switching device 312, current produced by power supply 108 will flow through switching device 312 rather than the span 106 powered by power supply 108, thus depriving holding current to any protective devices 114-1, 114-2, and 114-3 that have been activated. In one implementation of such an embodiment, positive voltage V1 is applied to gate 313 by a voltage signal generated by switch controller 112.

In the embodiment shown in FIG. 3, positive voltage V1 is applied to gate 313 by passing a pilot current (Ip) through one or more biasing resistors 316 and 317, which is in turn controlled by a pilot switching device 318. In the particular embodiment shown in FIG. 3, pilot switching device 318 is a FET (though, in other embodiments, other types of switching devices are used). More specifically, in the embodiment shown in FIG. 3, switching device 312 is an n-channel enhancement mode MOSFET having a drain 319 coupled to biasing resistor 317, a source 320 coupled to ground 115, and a gate 321. In one implementation of such an embodiment, positive voltage V2 is applied to gate 321 by a voltage signal generated by switch controller 112. The particular resistances values for biasing resistors 316 and 317 are determined based on the selection of switching device 312 and the operating voltage of power supply 108.

In the embodiment shown in FIG. 3, switching circuit 142 comprises a switching device 342 coupled to prevent a short-circuit current flow in second leg 146 created when switching circuit 141 shorts first leg 145 to second leg 146. As described above, interrupting the short circuit current flow created by shorting first leg 145 to second leg 146 allows power supply 108 to continue to supply power to the various devices within the central office terminal 102 while switch 141 is closed. Opening second leg 146 while leaving first leg 145 connected to power supply 108 further allows power supply 108 to continue to supply pilot current (Ip) to resistors 316 and 317 to maintain switching device 312 in a closed state (that is, shorting first leg 145 to second leg 146).

In the embodiment shown in FIG. 3, switching device 342 comprises a FET (though, in other embodiments, other switching devices are used). Switching device 342 is maintained in a closed state that allows power to flow through first leg 145 and second leg 146 during normal operating conditions (that is, when the overload signal 118 is not asserted). More specifically, in the embodiment shown in FIG. 3, switching device 342 comprises an n-channel enhancement mode MOSFET having a drain 346 coupled to the load side of second leg 146, a source 347 coupled to the source side of second leg 146, and a gate 348. In this embodiment, a positive voltage (V3) is maintained at the gate 348 in order to maintain switching device 342 in a closed state. When positive voltage (V3) is removed from the gate 348 of the switching device 342, the switching device 342 will switch to an open state that interrupts current flow through second leg 146. In the particular embodiment shown in FIG. 3, one or both of the first leg 145 and the second leg 146 contains one or more inductive elements 355 and 356 that react to sudden changes in current flow in the respective legs 145 or 146 by producing a voltage to resist that current change. Such a sudden change in current flow occurs in the embodiment shown in FIG. 3 when switching device 342 interrupts the short-circuit current flow in second leg 146 created when switching circuit 141 shorts first leg 145 to second leg 146. In such an embodiment, switching circuit 142 further comprises one or more diodes 349 to allow the discharge of inductive voltages produced due to the interruption of current flow by switching circuit 142.

Although a particular embodiment of switch 120 is shown in FIG. 1 and particular embodiments of switching circuits 141 and 142 are shown in FIG. 3, the switch 120, and switching circuits 141 and 142 can be implemented in other ways. For example, in alternate embodiments, depletion-mode MOSFETs, or any other switching technology are used to implement switching circuits 141 and 142.

Figure 4:
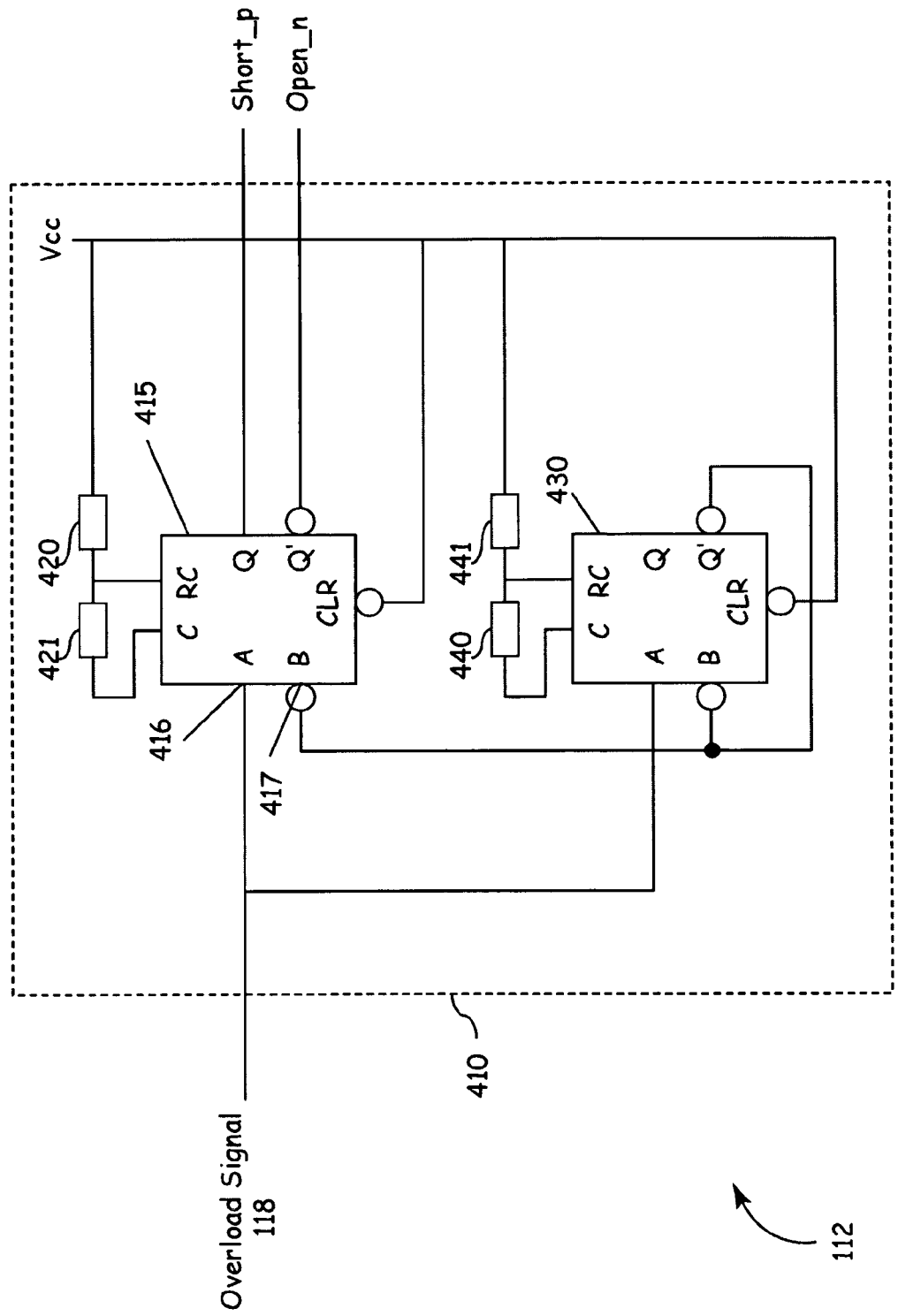
FIG. 4 is a simplified circuit diagram of one embodiment of a switch controller.

FIG. 4 is a simplified circuit diagram of one embodiment of the switch controller 112 of FIG. 1. The particular embodiment of switch controller 112 shown in FIG. 4 is described here as being implemented in the network 100 of FIG. 1 and for use with the embodiments of the switching circuits 141 and 142 shown in FIG. 3. In the embodiment shown in FIG. 4, switch controller 112 comprises a timing circuit 410 that operates on the switching circuits 141 and 142 (shown in FIG. 3). In the embodiment shown in FIG. 4, upon assertion of the overload signal 118 by the power supply 108, switch controller 112 outputs a voltage signal to gate 321 of switching device 318 in order to short first leg 145 to second leg 146. In such an embodiment, switch controller 112 "normally" (that is, when overload signal 218 is not asserted) maintains a voltage signal to gate 348 of switching device 342 in order allow current to flow in second leg 146. When overload signal 118 is asserted by the power supply 108, switch controller 112 removes the voltage signal from gate 348 to prevent current flow in second leg 146.

Because an overload condition can exist on span 106 for reasons other than the operation of protective devices 114-1 to 114-3, in one implementation of such an embodiment, switch controller 112 cycles switching circuits 141 and 142 only once within a pre-defined time period, to allow other protective features of power interface 104 to detect and mitigate other potential fault conditions based on a continuing overload condition. In one such implementation, when timing circuit 410 initially detects that the overload signal 118 has been asserted, timing circuit 410 reacts by outputting a voltage signal (illustrated in FIGS. 3 and 4 as "Short_p") to gate 321 of switching device 318 for a period of t1 seconds. This causes switching device 312 to allow current to flow between drain 314 and source 315 thus shorting together first leg 145 and second leg 146, as described above, for t1 seconds. In such an implementation, timing circuit 410 further maintains an output voltage signal to gate 348 of switching device 342 (illustrated in FIGS. 3 and 4 as "Open$_{13}$ n") allowing current to flow through second leg 146 during normal operating conditions (for example, no span faults or overload conditions).

Then, when timing circuit 410 initially detects that the overload signal 118 has been asserted, timing circuit 410 further reacts by removing the Open_n voltage signal from gate 348 of switching device 342, for t1 seconds, thus interrupting current flow through second leg 146.

After t1 seconds have elapsed since the overload signal 118 was initially asserted and when overload signal 118 is again asserted within a period of t2 seconds, timing circuit 410 can assume that an anomaly exists on span 106 for reasons other than protective devices 114-1, 114-2 and 114-3 being activated. In one embodiment, timing circuit 410 ignores the subsequent assertion of the overload signal 118 for a waiting period of t2 seconds after initially detecting the assertion of the overload signal 118. The t2 second waiting period allows other protective features of the power interface 104 sufficient time to sense and mitigate a continuing overload condition.

Timing circuit 410 can be implemented in numerous ways. In the particular embodiment shown in FIG. 4, timing circuit 410 comprises a first monostable 415 and a second monostable 430. In one implementation of such an embodiment, one or both of first monostable 415 and second monostable 430 are implemented using a CD4538 monostable integrated circuit device. In the embodiment shown in FIG. 4, first monostable 415 is coupled to overload signal 118 at input A 416. In one implementation where overload signal 118 is asserted by transitioning the overload signal 118 from low to high, when the overload signal 118 is asserted, first monostable 415 outputs voltage signal Short_p as one HIGH level pulse having a duration determined by a resistor 420 and a capacitor 421, and outputs voltage signal Open_n as one LOW level pulse also having a duration determined by resistor 420 and capacitor 421. The pulse durations determined by resistor 420 and capacitor 421 establish the time period t1 described above with respect to FIG. 3. In such an embodiment, voltage signals Short_p and Open_n respectively are used to cause the switching circuits 141 to change to a closed state and the switch device 142 to change to an open state as describe above in FIG. 3.

Second monostable 430 is also coupled to receive overload signal 118 from power supply 108. In one implementation where the overload signal 118 is asserted by transitioning the overload signal 118 from low to high, when the overload signal 118 is asserted, second monostable 430 outputs a voltage signal to monostable 415 input B 417 as one LOW level pulse having a duration determined by a resistor 440 and a capacitor 441. The pulse durations determined by resistor 440 and capacitor 441 establish the time period t2 described above with respect to FIG. 3. Reception of the LOW level pulse at input B 417 prevents monostable 415 from retriggering voltage signals Short_p and Open_n pulses for the duration of time period t2, thus blocking timing circuit 410 from reacting to an overload signal 118 transition during time period t2.

Figure 5:
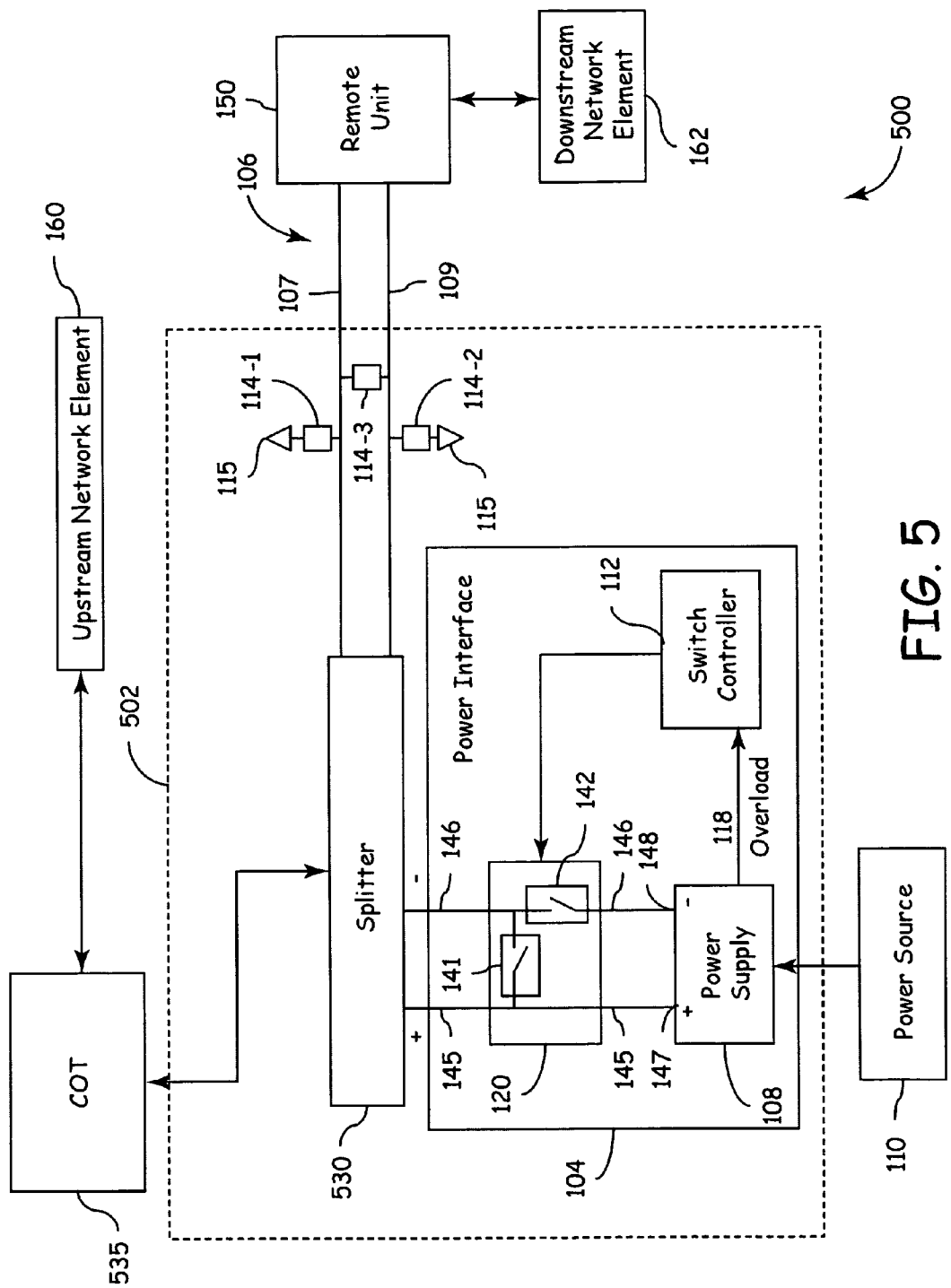
FIG. 5 is a block diagram of one embodiment of a network.

FIG. 5 is a block diagram of one embodiment of a network 500. In the particular embodiment shown in FIG. 5, the source network element 502 comprises a power module located in a central office of a service provider and is also referred to here as "power module 502" (though it is to be understood that, in other embodiments, the source network element is implemented in other ways and/or in other devices). In the particular embodiment shown in FIG. 5, the power module 502 is coupled to a central office terminal 535. The central office terminal 535 is communicatively coupled to one or more upstream network elements 160 (which in turn communicatively couples the central office terminal 535 to one or more other networks such as the Internet and/or a public switched telephone network (PSTN)) and the remote unit 150 is communicatively coupled to one or more downstream network elements 162 as described above with respect to FIG. 1.

Although only one upstream network element 160 and one downstream network element 162 is shown in FIG. 5, others numbers of upstream network elements 160 or downstream network elements 162 are used in other embodiments.

In the particular embodiment shown in FIG. 5, the central office terminal 535 and the remote unit 150 communicate over a DSL communication link provisioned therebetween. In other implementations and embodiments, other types and numbers of communication links are used and/or are provisioned over other types of communication media.

The power module 502, in such an embodiment, is used to apply span power to the span 106 in order to power the remote unit 150 while passing through all data traffic communicated between the central office terminal 535 and the remote unit 150. In this way, the remote unit 150 can be span powered even though the central office terminal 535 does include span-power functionality.

In the particular embodiment shown in FIG. 5, the span 106 is implemented using a single twisted-pair telephone line comprising a tip line 107 and a ring line 109 and the communication link is provisioned on the same communication medium used to supply power from power module 502 to the remote unit 150 (that is, on the twisted-pair telephone line used to implement the span 106). In other embodiments, a separate communication medium (that is, separate from the communication medium used to supply span power) is used to provision a communication link between a source network element and a sink network element.

In the embodiment shown in FIG. 5, the span 106 is protected from destructive voltage surges by one or more protective devices as described with respect to FIG. 1. In the embodiment shown in FIG. 5, protective devices 114-1, 114-3 and 114-3 are configured in a delta configuration where the first protective device 114-1 is coupled between the tip line 107 and ground 115, the second protective device 114-2 is coupled between the ring line 109 and ground 115, and the third protective device 114-3 is coupled between the ring line 109 and the tip line 107. In other embodiments, where the span 106 is implemented using communication media that comprise two or more conductors include protective devices applied between the conductors and ground in any of the possible combinations. In other embodiments, the protective devices are connected in alternate configurations as discussed above with respect to FIG. 8. Further embodiments use multiple protection device connected in series to achieve a desired breakdown voltage level.

In the embodiment shown in FIG. 5, the power module 502 comprises the power interface 104 described above in connection with FIG. 1. The power interface 104 couples the power module 502 to a power source 110 in order to obtain power that is used to power the power module 502 and to provide power to remote unit 150 over the span 106. In the particular embodiment shown in FIG. 5, the power interface 104 includes the power supply 108 that is coupled to the power source 110.

In the embodiment shown in FIG. 5, the power module 502 includes a splitter 530 that combines an output signal of the central office terminal 535 (which includes data to be transmitted to the remote unit 150 on the span 106) and an output signal of the power interface 104 (which includes power to be supplied to the remote unit 150 on the span 106) and applies the combined data and power signal to span 106. Also, the splitter 530 forwards the signal received from the span 106 (which includes data transmitted from the remote unit 150 on the span 106) to the central office terminal 535.

The power interface 104 comprises the same components (with like numbers referring to like components) and operates in the same manner as described above in connection with FIGS. 1-4. As such, the advantages described above can be realized in such an embodiment.

Although the particular embodiments illustrated above in connection with FIGS. 1-5 involve supplying power from a source network element to a sink network element using one or more twisted-pair telephone lines over which one or more DSL communication links a provisioned, in other embodiments are implemented in other ways. The techniques described can be implemented in applications that make use of, for example, power-over-ETHERNET ("POE") and/or ETHERNET-in-first-mile ("EFM") technology. Examples of such technology is described in the Institute of Electrical and Electronics Engineers (IEEE) 802.3af and 802.3ah standards, respectively (both of which are incorporated herein by reference). For example, in one such alternative embodiment, power is supplied over unshielded twisted-pair (UTP) cabling (for example, "CATEGORY 5" cabling) from a source network element located at a service provider's facility (for example, an access node in a central office) to a sink network element (for example, a network interface device (NID) located at a customer location). The techniques described here can be used in such an embodiment to automatically reset protective devices used in or for the access node and/or NID.

Figure 6:
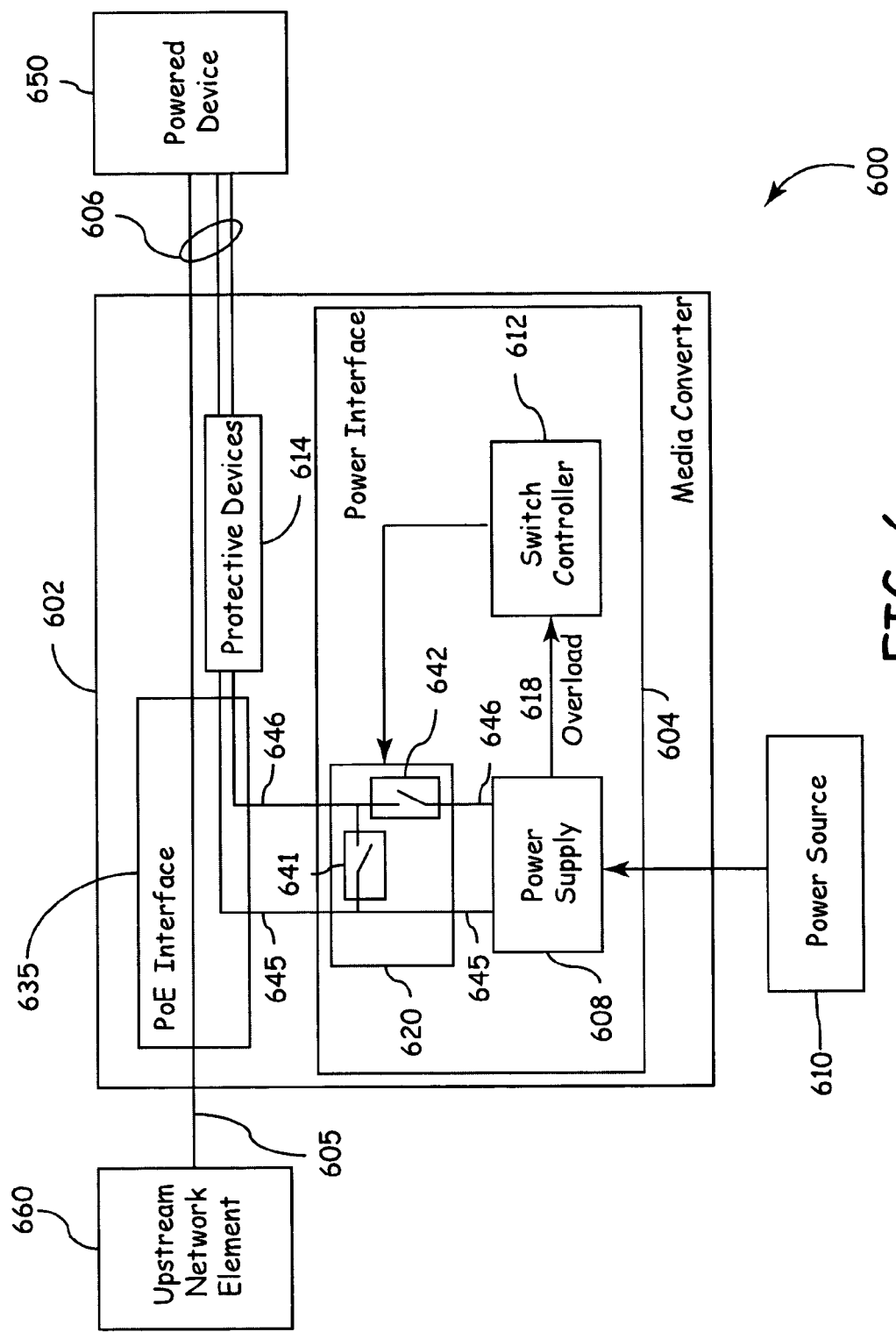
FIG. 6 is a block diagram of one embodiment of a network.

FIG. 6 is a block diagram of one embodiment of a network 600 that includes at least one source network element 602 that provides power using power-over-ETHERNET ("POE") and/or ETHERNET-in-first-mile ("EFM") techniques to at least one sink network element 650 over a communication medium 606. In the particular embodiment shown in FIG. 6, the source network element 602 comprises a media converter (also referred to here as "media converter 602"). In one implementation of network 600, communication medium 606 is implemented using a Category 5 unshielded twisted-pair (UTP) cable. In one implementation of media converter 602, media convert 602 is an IEEE 802.3af compliant device that provides 48 volts DC over two pairs of communication medium 606 to sink network element 650. In one implementation, media converter 602 inserts DC voltage into unused wires of communication medium 606. Sink network element 650 comprises one or more POE powered devices (only one of which is shown in FIG. 6) and is also referred to here as "powered device 150." Exemplary powered devices include, without limitation, IP phones, wireless base stations, video cameras, and other IEEE 802.3af compliant appliances.

Media converter 602 is typically communicatively coupled to at leas one upstream network element 660 via a data link 605. In alternate implementations, data link 605 may comprise one or more of, but not limited to, a fiber optical communications medium, a coaxial or twisted pair cable, or a wireless communications link. In the particular embodiment shown in FIG. 6, upstream network element 660 communicatively couples the media converter 602 to one or more other networks such as the Internet and/or a public switched telephone network (PSTN).

In the embodiment shown in FIG. 6, the media converter 602 comprises an PoE interface 635 for communicatively coupling the media converter 602 to the upstream network element 660 and for communicatively coupling the media converter 602 to the powered devices 650 over the communication medium 606. The PoE interface 635 comprises appropriate functionality for formatting upstream traffic received from upstream network element 660 via data link 605 into a format suitable for transmission on communication medium 606 (and the communication link provisioned thereon) and for transmitting the formatted upstream traffic on the communication medium 606 (and the communication link provisioned thereon). The PoE interface 635 further comprises appropriate functionality for formatting downstream traffic received from powered device 650 via the communication medium 606 into a format suitable for transmission via data link 605 to upstream network element 660 and for transmitting the formatted downstream traffic to upstream network element 660. In one implementation media converter 602 communicates with upstream network element 660 via an IEEE 802.3ah compliant communications link (that is, an Ethernet in the First Mile (EFM) compliant link).

Communication medium 606 is protected from destructive voltage surges by one or more protective devices 614, such as those protective devices described with respect to protective devices 114-1, 114-2 and 114-3 of FIG. 1. Protective devices may include protective devices applied in any of the possible combinations between the various conductors of communications medium 606 and/or ground.

In the embodiment shown in FIG. 6, the media converter 602 comprises a power interface 604, having the functionality previously described with respect to power interface 104 in FIG. 1, for coupling the media converter 602 to a power source 610 in order to obtain power that is used to power the media converter 602 and to provide power to powered device 650 over the communication medium 606. In the particular embodiment shown in FIG. 6, the power interface 604 includes a power supply 608 that is coupled to the power source 610.

In one implementation, PoE interface 635 applies an output signal from upstream network element 660 (which includes data to be transmitted to the powered devices 650 on the communication medium 606) to two unshielded twisted-pair conductors of a eight conductor Category 5 communication media of communication medium 606. The PoE interface 635 further applies an output signal from power interface 604 (which includes power to be supplied to the powered devices 650 via communication medium 606) to the remaining two unshielded twisted-pair conductors of the eight conductor Category 5 communication media of communication medium 606.

When one of protective devices 614 activate, the protective devices will remain activated as long as power supply 608 continues to provide a sufficient current that exceeds the holding currents of the protective devices. In the embodiment shown in FIG. 6, the protective devices 614 can be deactivated without rebooting the power supply 108 by shorting together the two output legs 645 and 646 of power supply 608 that supply power to communication medium 606. By shorting the output legs 645 and 646 of power supply 608, the protective devices 614 are deprived of the holding current the protective devices require to remain activated.

In the particular embodiment shown in FIG. 6, in order to short output legs 645 and 646 of power supply 608, the power interface 604 further comprises switch 620 and switch controller 612. Switch controller 612 controls the operation of switch 620 based on an overload signal 618 output by the power supply 608. In the particular embodiment shown in FIG. 6, switch 620 comprises a first switching circuit 641 that, in response to the overload signal 618 being asserted by the switch controller 612, shorts the first leg 645 of the output of power supply 608 to the second leg 646 of the output of the power supply 608.

In operation, power supply 608 asserts the overload signal 618 when power supply 608 is supplying power with an anomalously low output voltage (which is indicative of an activated protection device). When an overload condition exists, power supply 608 indicates the overload condition to switch controller 612 by asserting the overload signal 618. Switch controller 612 reacts to the assertion of the overload signal 618 by activating switch 620 to short the output legs 645 and 646 of power supply 608. When an overload condition results from the operation of protective devices 614, activating switch 620 shorts the output of power supply 608, thus denying protective devices 614 with the holding current the protective devices need to remain activated. Thus, protective devices 613 are deactivated to restore power to one or more remote units 650. In one implementation of switch 620, the switch further comprises a second switching circuit 642. In response to the overload signal 618 being asserted by the switch controller 612, second switching circuit 642 opens to decouple from power supply 608 the short created by first switching circuit 641 when the overload signal 618 is asserted.

In another alternative embodiment, the techniques described are used in a cellular wireless network in which a remote antenna unit is powered by a communication medium (for example, a coaxial cable) coupled between the remote antenna unit and a respective base station or other host unit. The techniques described here can be used in such an embodiment to automatically reset protective devices used in or for the remote antenna unit and/or base station or other host unit.

In another alternative embodiment, the techniques are used in a cable television distribution network in which a customer premises located set top box is powered by a communication medium (for example, a coaxial cable) coupled between the set top box and a respective optical network unit. The techniques described here can be used in such an embodiment to automatically reset protective devices used in or for the set top box or optical network unit.

In still another alternative embodiment, the techniques are used with communications mediums (for example, a coaxial cable or a twisted pair cable) carrying a wetting current. In such applications, a current is applied by a first network element to a communications medium to ensure continuity of the communications medium to a second network element. A loss of current flow would indicate a fault in the communications medium. The techniques described here can be used in such an embodiment to automatically reset protective devices used in or for the first network element and/or the second network element.

Figure 7:
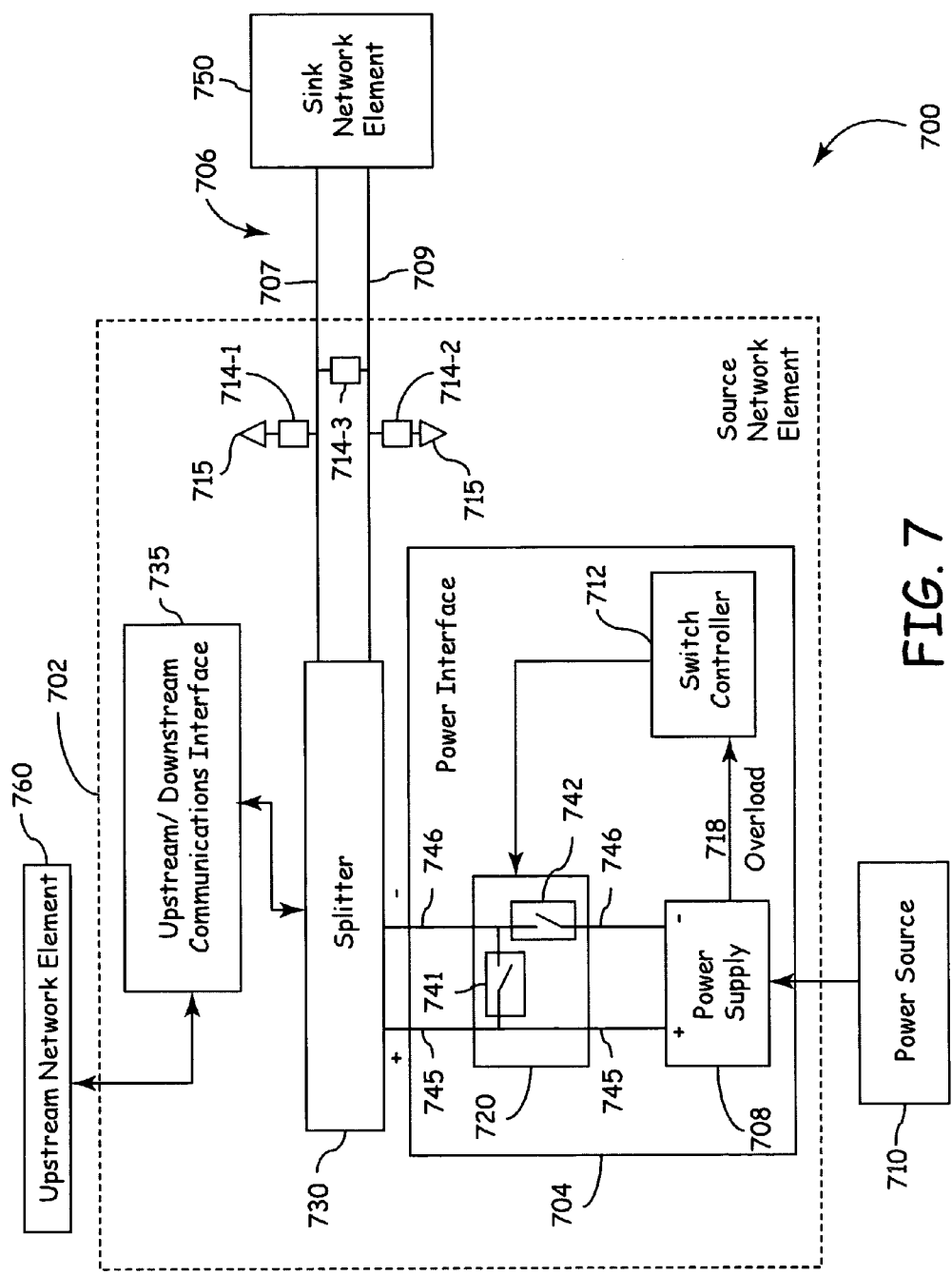
FIG. 7 is a block diagram of one embodiment of a network.

FIG. 7 is a block diagram of a network 700 illustrating the alternative embodiments discussed above. In one implementation of the embodiment shown in FIG. 7, network 700 is a cellular communications network. In such an implementation the source network element 702 comprises a host unit (also referred to as a base station 702) for a cellular communications network. Base station 702 is communicatively coupled to an upstream network element 760 (which in turn communicatively couples the base station 702 to one or more other networks such as the Internet and/or a public switched telephone network (PSTN)). Base station 702 communicates voice and data signals between sink network element 750 the upstream network element 760. In one implementation of the embodiment shown in FIG. 7, sink network element 750 comprises a remote unit coupled to a cellular antenna tower. In that case, sink network element 750 comprises appropriate functionality for wirelessly transmitting the formatted upstream traffic received on the span 706 from base station 702, and for receiving and transmitting via span 706 downstream traffic received from one or more wireless subscriber units 762 to host unit 702.

In another implementation of the embodiment shown in FIG. 7, network 700 is a cable television distribution network. In such an implementation the source network element 702 comprises an optical network unit 702. Optical network unit 702 functions as an access node that converts optical signals transmitted via fiber from an upstream network element 760 to electrical signals that can be transmitted via coaxial cable or twisted pair copper wiring to individual cable service subscribers. Upstream network element 760 in turn communicatively couples the optical network unit 702 to a cable television system. Source network element 702 communicates voice, video and data signals between sink network element 750 and the upstream network element 760. In one implementation of the embodiment shown in FIG. 7, sink network element 750 comprises a set-to-box coupled to a television receiver. In that case, sink network element 750 comprises appropriate functionality for transmitting the upstream traffic received on the span 706 from optical network unit 702, and for receiving and transmitting via span 706 downstream traffic data from the set top box to optical network unit 702.

In the particular embodiment shown in FIG. 7, the source network element 702 and the sink network element 750 communicate over a communication link implemented on span 706 using a single cable comprising a first conductor 707 and a second conductor 709. In one implementation of network 700, the communication link is provisioned on the same cable used to supply power from the source network element 702 to sink network element 750. In still another implementation, power to sink network element 750 is supplied to by another source (not shown) while source network element 702 supplies a wetting current to span 706 for the purposes of monitoring the continuity of span 706.

In the embodiment shown in FIG. 7, the source network element 702 communicates with upstream network element 760 via an upstream/downstream communication interface 735. The upstream/downstream communication interface 735 comprises appropriate functionality for formatting upstream traffic received from the upstream network element 760 into a format suitable for transmission on the span 706 (and the communication link provisioned thereon) and for transmitting the formatted upstream traffic on the span 706 (and the communication link provisioned thereon). The upstream/downstream communication interface 735 further comprises appropriate functionality for formatting downstream traffic received from sink network element 750 via the span 706 into a format suitable for transmission to the upstream network element 760 and for transmitting the formatted downstream traffic to the upstream network element 760.

In the embodiment shown in FIG. 7, the span 706 is protected from destructive voltage surges by one or more protective devices 714-1, 714-2 and 714-3, such as those protective devices described with respect to FIG. 1. In the embodiment shown in FIG. 7 protective devices 714-1, 714-2 and 714-3 are connected in a delta configuration where the first protective device 714-1 is coupled between the first conductor 707 and ground 715, the second protective device 714-2 is coupled between the second conductor 709 and ground 715, and the third protective device 714-3 is coupled between the first conductor 707 and the second conductor 709. In other embodiments, the protective devices are connected in alternate configurations as discussed above with respect to FIG. 8. Further embodiments use multiple protection device connected in series to achieve a desired breakdown voltage level.

In the embodiment shown in FIG. 7, the source network element 702 comprises a power interface 704, for coupling the source network element 702 to a power source 710 in order to obtain power that is used to power the source network element 702. In one implementation, source network element 702 is coupled to power source 710 in order to provide power to sink network element 750 over the span 706. In one implementation, source network element 702 is coupled to power source 710 in order to provide power for a wetting current to sink network element 750 over the span 706.

In the particular embodiment shown in FIG. 7, the power interface 704 includes the power supply 708 that is coupled to a power source 710. Further, remote unit 702 includes a splitter 730 that combines an output signal of the upstream/downstream communication interface 735 (which includes data to be transmitted to the sink network element 750 on the span 706) and an output signal of the power interface 704, and applies the combined data and power signal to span 706. Also, the splitter 730 forwards the signal received from the span 706 (which includes data transmitted from sink network element 750 on the span 706) to the upstream/downstream communication interface 735.

When one or more of the protective devices 714-1, 714-2 and 714-3 activate, the protective devices will remain activated as long as power supply 708 continues to provide a sufficient current that exceeds the holding currents of the protective devices. In the embodiment shown in FIG. 7, the protective devices 714-1, 714-2 and 714-3 can be deactivated without rebooting the power supply 708 by shorting together the two output legs 745 and 746 of power supply 708 that supply the power and/or wetting current to span 706. By shorting the output legs 745 and 746 of power supply 708, the protective devices 714-1, 714-2 and 714-3 are deprived of the holding current the protective devices 714-1, 714-2 and 714-3 require to remain activated.

In the particular embodiment shown in FIG. 7, in order to short output legs 745 and 746 of power supply 708, the power interface 704 further comprises switch 720 and switch controller 712. Switch controller 712 controls the operation of switch 720 based on an overload signal 718 output by the power supply 708. In the particular embodiment shown in FIG. 7, switch 720 comprises a first switching circuit 741 that, in response to the overload signal 718 being asserted by the switch controller 712, shorts the first leg 745 of the output of power supply 708 to the second leg 746 of the output of the power supply 708.

In operation, power supply 708 asserts the overload signal 718 when power supply 708 is supplying power (either to power sink network element 750 or to power wetting current for span 706) with an anomalously high output current. When an overload condition exists, power supply 708 indicates the overload condition to switch controller 712 by asserting the overload signal 718. Switch controller 712 reacts to the assertion of the overload signal 718 by activating switch 720 to short the output legs 745 and 746 of power supply 708. When an overload condition results from the operation of one or more of protective devices 714-1, 714-2 and 714-3, activating switch 720 shorts the output of power supply 708, thus denying protective devices 714-1, 714-2, 714-3 with the holding current the protective devices need to remain activated. Thus, protective devices 714-1, 714-2 and 714-3 are deactivated. In one implementation of switch 720, switch 720 further comprises a second switching circuit 742. In response to the overload signal 718 being asserted by the switch controller 712, second switching circuit 742 opens to decouple from power supply 708 the short created by first switching circuit 741 when the overload signal 718 is asserted.

Several means are available to implement the power interface, switches and switch controller discussed above. These means include, but are not limited to, digital computer systems, programmable controllers, or field programmable gate arrays. Therefore other embodiments of the present invention are program instructions resident on computer readable media which when implemented by such processors, enable the processors to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for deactivating a protective device, the method comprising:
   determining when an overload condition occurs on a communication medium;
   when the overload condition occurs, deactivating at least one protective device by applying, for a first predetermined period of time, a short-circuit to an output of a power supply that provides a holding current to the at least one protective device; and
   after the first predetermined period of time has elapsed, removing the short-circuit on the output of the power supply.

2. The method of claim 1, further comprising:
   supplying power to a network element coupled to the communication medium via the communication medium.

3. The method of claim 1, further comprising:
   supplying a wetting current to a network element coupled to the communication medium via the communication medium.

4. The method of claim 1, further comprising:
   when the overload condition still exists within a second predetermined period of time after removing the short-circuit on the output of the power supply, shutting down the power supply.

5. The method of claim 1, wherein the communication medium includes at least one twisted-pair telephone line having at least one of a first protective device coupled between a first line of the twisted-pair telephone line and a ground, a second protective device coupled between a second line of the twisted-pair telephone line and the ground, and a third protective device coupled between the first line and the second line of the twisted-pair telephone line.

6. The method of claim 1, wherein the at least one protective device includes a crowbarring solid-state surge protector.

7. The method of claim 1, wherein the at least one protective devices is deactivated when a current conducted by the protective device drops below a holding current.

8. The method of claim 1, wherein the first predetermined time period is less than 15 milliseconds.

9. The method of claim 1, wherein the first predetermined time period is less than a ride through capacity period of the network element.

10. The method of claim 1, wherein the second predetermined time period is greater than the first predetermined time period.

11. The method of claim 1, further comprising:
    when the overload condition occurs, opening a first leg of the output of the power supply supplying power to the communication medium for the first predetermined period of time.

12. The method of claim 1, wherein the communication medium includes one or more of a twisted-pair cable, an unshielded twisted pair cable, a category 5 Ethernet cable, and a co-axial cable.

13. A power interface for a network element having a power supply that produces an overload signal when an overload condition exists, the power interface comprising:
    means for generating a switching signal responsive to the overload signal; and
    means for switching together a first output leg and a second output leg of the power supply, wherein the first output leg and the second output leg provide a holding current for one or more protective devices, the means for switching together responsive to the means for generating a switching signal;
    wherein the means for switching together switches together the first output leg and the second output leg of the power supply for a first predetermined period of time in response to the switching signal.

14. The power interface of claim 13, wherein when the means for generating a switching signal blocks the means for switching from switching together the first output leg and the second output leg of the power supply more than once during a second predetermined period of time.

15. The power interface of claim 13, wherein switching together the first output leg and the second output leg of the power supply for the first predetermined period of time causes the one or more protective devices to reset.

16. A power interface for a network element, the power interface comprising:
    a shorting switch coupled across a first output and a second output of a power supply and adapted to apply a short-circuit across the first output and the second output when closed;
    a switch controller coupled to the shorting switch and adapted to receive an overload signal from the power supply; the switch controller further adapted to close the shorting switch coupled across the first output and the second output when the overload signal is asserted;
    wherein when the overload signal is asserted, the switch controller is adapted to deactivate at least one protective device by closing the shorting switch for a first predetermined period of time.

17. The power interface of claim 16, wherein the at least one protective devices is deactivated when a current conducted by the protective device drops below a holding current.

18. The power interface of claim 16, wherein the first predetermined time period is less than a ride through capacity period of a sink network element powered by the power supply.

19. The power interface of claim 18, wherein the sink network element receives power from the power supply through one or more of a twisted-pair cable, an unshielded twisted pair cable, a category 5 Ethernet cable, and a co-axial cable.

20. The power interface of claim 16, wherein when an overload signal is asserted, the switch controller is adapted to ignore subsequent assertions of the overload signal for a second predetermined period of time.

21. The power interface of claim 16, wherein the second predetermined time period is greater than the first predetermined time period.

22. The power interface of claim 16, further comprising a second switch adapted to decouple at least one of the first output and the second output of the power supply from the shorting switch;

wherein when the overload signal is asserted, the switch controller is further adapted to open the second switch for the first predetermined period of time.

23. The power interface of claim 16, wherein the at least one protective device includes a crowbarring solid-state surge protector.

* * * * *